United States Patent
La Pila et al.

(10) Patent No.: US 12,003,177 B2
(45) Date of Patent: Jun. 4, 2024

(54) METHOD AND APPARATUS FOR SENSING OUTPUT CURRENT IN A DC-DC CONVERTER CIRCUIT

(71) Applicant: STMicroelectronics S.r.l., Agrate Brianza (IT)

(72) Inventors: Marco La Pila, Gravina di Catania (IT); Giuseppe Platania, Valverde (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 168 days.

(21) Appl. No.: 17/748,214

(22) Filed: May 19, 2022

(65) Prior Publication Data
US 2023/0378870 A1  Nov. 23, 2023

(51) Int. Cl.
H02M 3/158  (2006.01)
H02M 1/00  (2006.01)

(52) U.S. Cl.
CPC ......... H02M 3/158 (2013.01); H02M 1/0009 (2021.05)

(58) Field of Classification Search
CPC ............................. H02M 3/158; H02M 1/009
See application file for complete search history.

(56) References Cited

U.S. PATENT DOCUMENTS

| | | | |
|---|---|---|---|
| 7,202,694 B2 | 4/2007 | Eberlein | |
| 7,772,818 B2 | 8/2010 | Smith | |
| 7,795,846 B2 | 9/2010 | Martin | |
| 8,044,644 B2 | 10/2011 | Huang et al. | |
| 8,179,105 B2 | 5/2012 | Lipcsei | |
| 8,253,405 B2 | 8/2012 | Trivedi et al. | |
| 8,471,545 B2 | 6/2013 | Couleur et al. | |
| 8,736,244 B1* | 5/2014 | Voigtlander | H02M 3/158 323/284 |
| 9,285,399 B2 | 3/2016 | Babazadeh et al. | |
| 9,292,028 B2 | 3/2016 | Capodivacca et al. | |
| 9,350,158 B2 | 5/2016 | Chen et al. | |
| 9,739,810 B2 | 8/2017 | Childs | |
| 9,755,518 B2 | 9/2017 | Bansal et al. | |
| 9,812,963 B1 | 11/2017 | Nguyen et al. | |
| 10,270,342 B2 | 4/2019 | Pullen et al. | |
| 10,454,369 B2 | 10/2019 | Savic et al. | |
| 10,756,614 B2 | 8/2020 | Pullen et al. | |
| 10,840,803 B2 | 11/2020 | Toni et al. | |
| 11,193,961 B2 | 12/2021 | Schrom et al. | |
| 2013/0082675 A1 | 4/2013 | Capodivacca et al. | |
| 2015/0227146 A1* | 8/2015 | Knoedgen | H02M 3/156 323/280 |

(Continued)

Primary Examiner — Rafael O De Leon Domenech
(74) Attorney, Agent, or Firm — Crowe & Dunlevy LLC

(57) ABSTRACT

A switching regulator circuit has a high side (HS) transistor actuated during on time ($T_{ON}$) of a duty cycle. The output current of the switching regulator circuit is determined from sensing a transistor current flowing through the HS transistor during HS transistor on time ($T_{ON}$) and dividing the sensed transistor current by the duty cycle to generate an output signal indicative of the output current of the switching regulator circuit. The duty cycle is determined from a ratio of the on time ($T_{ON}$) and off time ($T_{OFF}$) of the switching regulator circuit.

19 Claims, 2 Drawing Sheets

(56) References Cited

U.S. PATENT DOCUMENTS

| | | |
|---|---|---|
| 2018/0219484 A1 | 8/2018 | Mercer et al. |
| 2018/0294804 A1* | 10/2018 | Ali .................... H02M 3/1582 |
| 2018/0375435 A1* | 12/2018 | Muhoberac .......... H02M 3/158 |
| 2019/0386561 A1* | 12/2019 | King ...................... H02M 1/42 |
| 2021/0067041 A1 | 3/2021 | Cho et al. |
| 2021/0320590 A1* | 10/2021 | Ng ....................... H02M 1/008 |
| 2021/0351697 A1 | 11/2021 | Tyagi et al. |
| 2022/0014102 A1 | 1/2022 | Sreenivas et al. |
| 2022/0029520 A1 | 1/2022 | Chen et al. |

* cited by examiner

METHOD AND APPARATUS FOR SENSING OUTPUT CURRENT IN A DC-DC CONVERTER CIRCUIT

TECHNICAL FIELD

The present disclosure generally concerns switching regulators such as DC-DC converters and, in particular, the measurement of output current in a switching regulator.

BACKGROUND

A switching regulator is a circuit that receives power at a first voltage level from a power source and outputs power at a second, different, voltage level for use by a downstream electronic system (the load). It is known in the art for a switching regulator to monitor input current in connection with carrying out various circuit operations and functions. For example, the switching regulator may include a current control loop that monitors the input current and uses the monitored input current as a control variable in a feedback loop to control the behavior of the switching regulator. It is also useful to be able to monitor the output current delivered to the load to determine, for example, the output power provided by the switching regulator. One known solution for determining the output current of the switching regulator is to sense the currents flowing through the high-side (HS) transistor switch and low-side (LS) transistor switch. Output current can then be calculated by summing the high-side and low-side currents. Those skilled in the art recognize, however, that the measurement of the low-side current is adversely affected by switching dead time, during which no current through the HS or LS transistor switches can be sensed, despite the fact that the real current contribution is non-zero, and thus the summation of the high-side and low-side currents is an inaccurate measure of the actual output current of the switching regulator.

There is accordingly a need in the art for a method and apparatus that can more accurately determine the output current of a switching regulator.

SUMMARY

In an embodiment, a switching regulator circuit comprises: a high side (HS) transistor coupled between a first node and a switching node; a low side (LS) transistor coupled between the switching node and a second node; driver circuitry for controlling actuation of the HS transistor and LS transistor in accordance with a duty cycle; and an inductor having a first terminal coupled to the switching node and a second terminal coupled to a third node, wherein an output current flows through the inductor.

An output current detection circuit for said switching regulator circuit comprises: a current sensing circuit configured to sense a transistor current flowing through the HS transistor during HS transistor on time ($T_{ON}$); and a duty cycle detect and divide circuit configured to detect said duty cycle which controls actuation of the HS transistor and LS transistor, and divide the sensed transistor current by said duty cycle to generate an output signal indicative of the output current that flows through the inductor.

In an embodiment, a circuit for detecting output current of a switching regulator circuit having a high side (HS) transistor actuated during on time ($T_{ON}$) of a duty cycle comprises: a current sensing circuit configured to sense a transistor current flowing through the HS transistor during HS transistor on time ($T_{ON}$); and a duty cycle detect and divide circuit configured to detect said duty cycle, and divide the sensed transistor current by said duty cycle to generate an output signal indicative of the output current of the switching regulator circuit.

In an embodiment, a method for detecting output current of a switching regulator circuit having a high side (HS) transistor actuated during on time ($T_{ON}$) of a duty cycle comprises: sensing a transistor current flowing through the HS transistor during HS transistor on time ($T_{ON}$); detecting said duty cycle; and dividing the sensed transistor current by said duty cycle to generate an output signal indicative of the output current of the switching regulator circuit

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

Figure 1:
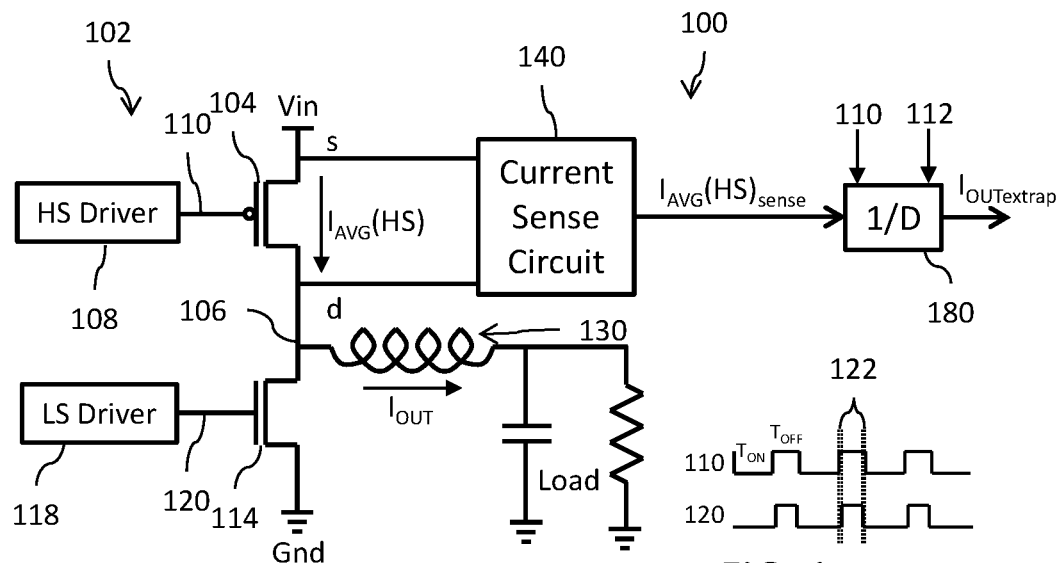
FIG. 1 is a block diagram showing a system including a switching regulator and an output current detection circuit that operates to determine the output current of the switching regulator.

The same elements have been designated with the same reference numerals in the different drawings. In particular, the structural and/or functional elements common to the different embodiments may be designated with the same reference numerals and may have identical structural, dimensional, and material properties.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

The determination of the output current of a switching regulator can advantageously be made dependent on a measurement of the current $I_{AVG}(HS)$ flowing through the high-side (HS) transistor switch during the switching on phase ($T_{ON}$). The average current in the inductor of the switching regulator (i.e., the regulator output current) is then extrapolated solely from the sensed high-side current using the switching duty cycle set by the ratio of the switching on phase ($T_{ON}$) to the switching off phase ($T_{OFF}$) for the HS transistor switch.

Consider, for example, a buck-type switching regulator. The average current $I_{AVG}(LS)$ flowing through the low-side (LS) transistor switch during the switching off phase ($T_{OFF}$) is given by:

$$I_{AVG}(LS) = I_{AVG}(HS) * \frac{T_{OFF}}{T_{ON}}$$

The output current $I_{OUT}$ of the switching regulator is then:

$$I_{OUT} = I_{AVG}(HS) + I_{AVG}(LS)$$

Substituting gives:

$$I_{OUT} = I_{AVG}(HS) * \left(1 + \frac{T_{OFF}}{T_{ON}}\right) = I_{AVG}(HS) * \left(\frac{T_{ON} + T_{OFF}}{T_{ON}}\right)$$

Where the real duty cycle D for switching the high-side (HS) transistor and low-side (LS) transistor switches is:

$$D = \frac{T_{ON}}{T_{ON} + T_{OFF}}$$

In this context, the "real" duty cycle means the duty cycle defined by the real times when the HS transistor switch is on ($T_{ON}$) and when the LS transistor switch is on ($T_{OFF}$), not the ideal duty cycle ($V_{OUT}/V_{IN}$).

Simplified:

$$I_{OUT} = \frac{I_{AVG}(HS)}{D}$$

Thus, by sensing the current $I_{AVG}(HS)$ flowing through the high-side (HS) transistor switch, and with knowledge of the real duty cycle D of the switching regulator, the output current of the switching regulator can be determined.

The current $I_{AVG}(HS)$ can be measured through a power-power sense circuit (described in more detail below) and the real duty cycle D can be extrapolated from the ratio $$\frac{T_{OFF}}{T_{ON}}$$

through the drive signals which control switching of the high-side (HS) transistor and low-side (LS) transistor switches. A division of the measured current $I_{AVG}(HS)$ by the real duty cycle D of the switching regulator is then made by a detect and divide circuit (described in more detail below) to generate a value corresponding to the output current of the switching regulator.

Reference is now made to FIG. 1 which shows a block diagram for an output current detection circuit 100 that operates to determine the output current of a switching regulator 102 (shown here to be of the buck-type, by example). The switching regulator 102 includes a high-side (HS) transistor switch 104 (for example, implemented as a p-channel MOS transistor) having a source terminal coupled, preferably directly connected, to an input voltage Vin and a drain terminal coupled, preferably directly connected, to a switching node 106. The gate of the HS transistor switch 104 is driven by a high side driver circuit 108 that outputs a high side control signal 110. The switching regulator 102 further includes a low-side (LS) transistor switch 114 (for example, implemented as an n-channel MOS transistor) having a drain terminal coupled, preferably directly connected, to the switching node 106 and a source terminal coupled, preferably directly connected, to a reference voltage node (for example, ground). The gate of the LS transistor switch 114 is driven by a low side driver circuit 118 that outputs a low side control signal 120. In a preferred embodiment, the high side control signal 110 and the low side control signal 120 have a same frequency and are non-overlapping pulse width modulated (PWM) signals where the high side control signal 110 controls the HS transistor switch 104 to turn on during a switching on phase ($T_{ON}$) and turn off during a switching off phase ($T_{OFF}$). In an embodiment, the low side control signal 120 may be derived from the high side control signal 110 with a small margin to avoid both transistors being on at the same time. The low side control signal 120 controls the LS transistor switch 114 to turn on during a portion of the switching off phase ($T_{OFF}$) which is delimited by a dead time 122 due to the non-overlapping switch control. An inductor 130 has a first terminal coupled, preferably directly connected, to the switching node 106 and a second terminal coupled, preferably directly connected, to an output node. A load circuit (represented here by a load capacitance and resistance in parallel) is coupled to the output node.

The output current detection circuit 100 includes a high side current sensing circuit 140 configured to sense the current $I_{AVG}(HS)$ flowing through the HS transistor switch 104 and output a signal indicative of the sensed current $I_{AVG}(HS)_{sense}$. A duty cycle detect and divide circuit (1/D) 180 processes the high side control signal 110 and the low side control signal 120 to determine the real duty cycle D of the switching regulator operation, and the signal indicative of the sensed current $I_{AVG}(HS)_{sense}$ is then divided by the determined the real duty cycle D to generate an output signal that is indicative of the extrapolated value $I_{OUTextrap}$ for the output current $I_{OUT}$ of the switching regulator.

Figure 2:
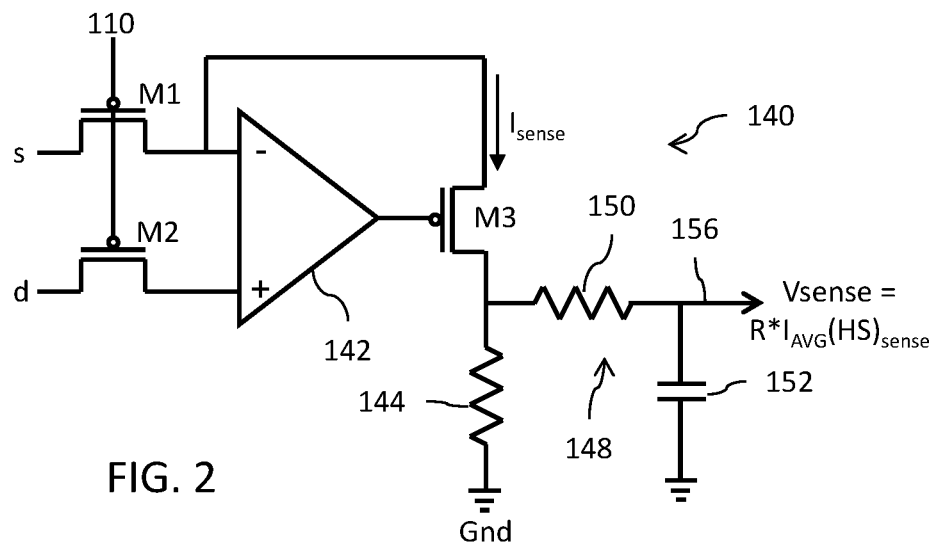
FIG. 2 is a circuit diagram for a current sensing circuit of the output current detection circuit.

Reference is now made to FIG. 2 which shows a circuit diagram for an embodiment of the current sensing circuit 140. A first input transistor M1 (for example, implemented as a p-channel MOS transistor) has a source terminal coupled, preferably directly connected, to the source terminal (s) of the HS transistor switch 104 (at the input voltage Vin) and a drain terminal coupled, preferably directly connected, to a first (inverting (−)) input of a differential amplifier 142. The gate terminal of the first input transistor M1 is driven by the high side control signal 110. A second input transistor M2 (for example, implemented as a p-channel MOS transistor) has a source terminal coupled, preferably directly connected, to the drain terminal (d) of the HS transistor switch 104 (at the switching node 106) and a drain terminal coupled, preferably directly connected, to a second (non-inverting (+)) input of the differential amplifier 142. The gate terminal of the second input transistor M2 is also driven by the high side control signal 110. An output transistor M3 (for example, implemented as a p-channel MOS transistor) has a source terminal coupled, preferably directly connected, in a negative feedback circuit to the first (inverting) input of the differential amplifier 142. A resistor 144 has a first terminal coupled, preferably directly connected, to a drain terminal of the output transistor M3 and a second terminal coupled, preferably directly connected, to the reference voltage node (for example, ground). A passive low-pass filter circuit 148 formed by the series circuit connection of a resistor 150 and capacitor 152 is coupled, preferably directly connected, between the drain terminal of the output transistor M3 and the reference voltage node. A series connection node 156 of the low-pass filter circuit 148 between the resistor 150 and capacitor 152 provides an output of the current sensing circuit 140 producing the signal indicative of the sensed current $I_{AVG}(HS)_{sense}$. The first and second input transistors M1, M2 function to sample the source and drain voltages, respectively, of the HS transistor switch 104 responsive to the high side control signal 110 only during switching on phase ($T_{ON}$) for application to the differential amplifier 142. The difference between those sampled voltages is converted by the differential amplifier 142 and output transistor M3 to a current $I_{sense}$ which replicates the current flowing through the inductor 130 during switching on phase ($T_{ON}$). This current $I_{sense}$ is converted to a voltage by resistor 144 and the voltage is smoothed by the low pass filter circuit 148 to generate an output voltage Vsense.

Figure 3:
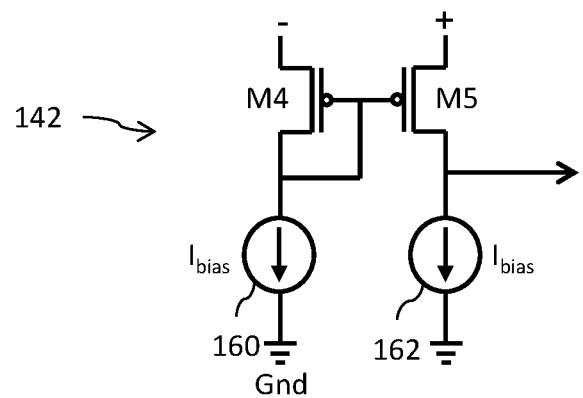
FIG. 3 is a circuit diagram for an amplifier used in the current sensing circuit.

FIG. 3 shows a circuit diagram for an embodiment of the differential amplifier 142. A first amplifier transistor M4 (for example, implemented as a p-channel MOS transistor) has a source terminal coupled, preferably directly connected, to the inverting (−) input of the differential amplifier 142 and a drain terminal biased by a first current sink circuit 160 configured to sink a current $I_{bias}$ to the reference voltage node. A second amplifier transistor M5 (for example, implemented as a p-channel MOS transistor) has a source terminal coupled, preferably directly connected, to the non-inverting (+) input of the differential amplifier 142 and a drain terminal biased by a second current sink circuit 162 configured to sink the current $I_{bias}$ to the reference voltage node. The gate terminals of the transistors M4 and M5 are coupled, preferably directly connected, to each other and to the drain terminal of the transistor M4.

Let K be a ratio of power to power sense. During the switching on phase ($T_{ON}$) when the high side control signal 110 is asserted, transistors 104, M1 and M2 are all turned on. If the gain of the differential amplifier 142 is high enough to ensure that the voltages at the inverting (−) input and non-inverting (+) input of the differential amplifier 142 are substantially equal (through the negative feedback with transistor M3), the following is true:

$$V_{106} - K*R_{on}*I_{bias} = Vin - K*R_{on}*(I_{bias} + I_{sense})$$

Where: $V_{106}$ is the voltage at the switching node 106, $R_{on}$ is drain-to-source resistance of the transistor 104 in the ON state (i.e., Rds_on), $I_{bias}$ is the bias current for the current sink circuits 160, 162, and $I_{sense}$ is the current flowing through the transistor M3.

Then, the sensed current $I_{AVG}(HS)_{sense}$ is:

$$I_{AVG}(HS)_{sense} = \frac{V_{in} - V_{106}}{K*R_{on}} = \frac{I_{out\_on}}{K}$$

Where: $I_{out\_on}$ on is the average of the current flowing through the inductor 130 when the transistor 104 in the ON state.

It will accordingly be noted that the current $I_{out\_on}$ on and its replica current $I_{sense}$ (i.e., $I_{AVG}(HS)_{sense}$) increase with a ratio of K. In this context, K is substantially constant, and it allows to have the current $I_{sense}$ directly proportional to the current flowing through the inductor 130 when the HS transistor switch 104 is in the ON state. It is important that the value for K is large enough to have the magnitude of $I_{sense}$ in a range of some micro-amperes, despite an output current $I_{out\_on}$ on that has a magnitude on the order of amperes.

The signal at the output of the current sensing circuit 140 that is indicative of the sensed current $I_{AVG}(HS)_{sense}$ is actually a low pass filtered voltage Vsense that is equal to $R*I_{AVG}(HS)_{sense}$ where R is the resistance of the resistor 144.

Figure 4:
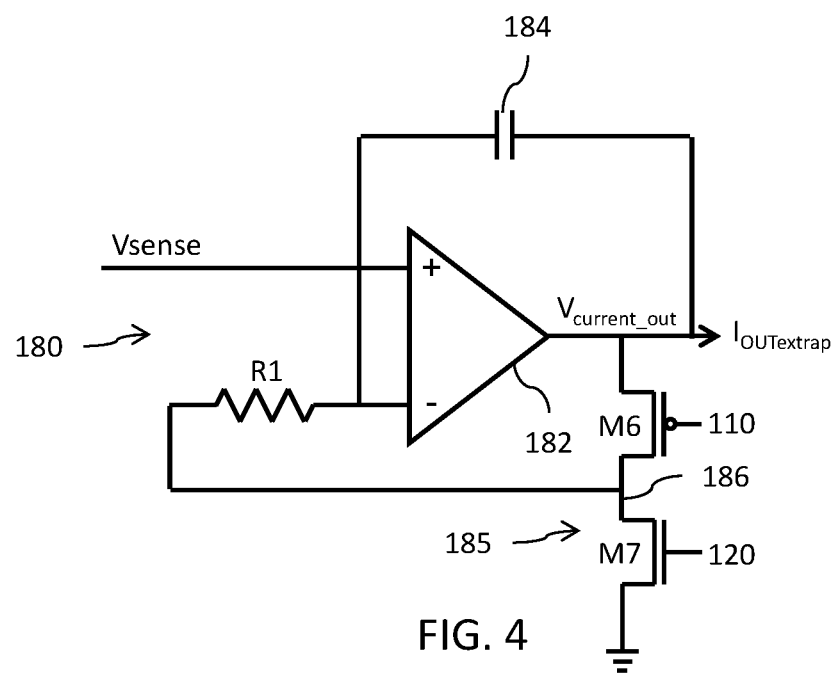
FIG. 4 is a circuit diagram for a duty cycle detect and divide circuit of the output current detection circuit.

Reference is now made to FIG. 4 which shows a circuit diagram for an embodiment of the duty cycle detect and divide circuit 180. A differential amplifier 182 includes a non-inverting (+) input coupled to receive the voltage Vsense (which is indicative of the sensed current $I_{AVG}(HS)_{sense}$ in the HS transistor switch 104 during the switching on phase ($T_{ON}$)). The output of the differential amplifier 182 is coupled, preferably directly connected, to the inverting (−) input in negative feedback by a capacitor 184. This forms a unity gain analog integration circuit that functions to integrate (i.e., average) the difference in voltages at the non-inverting (+) input and inverting (−) input. The voltage at the non-inverting (+) input is the voltage Vsense. The voltage at the inverting (−) input is a switched voltage selected by a voltage switching circuit 185 controlled by the ratio $$\frac{T_{OFF}}{T_{ON}}$$

to be equal to either the voltage $V_{current\_out}$ at the output of the differential amplifier 182 or the reference voltage (i.e., ground voltage).

The voltage switching circuit 185 includes a first switching transistor M6 (for example, implemented as a p-channel MOS transistor) having a source terminal coupled, preferably directly connected, to the output of the differential amplifier 182 and a drain terminal coupled, preferably directly connected, to a switching node 186. The gate of the first switching transistor M6 is driven by the high side control signal 110, and thus transistor M6 is turned on when control signal 110 is asserted (logic low). A second switching transistor M7 (for example, implemented as an n-channel MOS transistor) has a drain terminal coupled, preferably directly connected, to the switching node 186 and a source terminal coupled, preferably directly connected, to the reference voltage node. The gate of the second switching transistor M7 is driven by the low side control signal 120, and thus transistor M7 is turned on when control signal 120 is asserted (logic high). The switching node 186 is coupled in negative feedback through resistor R1 to the inverting (−) input of the differential amplifier 182. The signal generated at the switching node 186 is equal to $D*V_{current\_out}$, where $V_{current\_out}$ is the voltage at the output of the differential amplifier 182. When the high side control signal 110 turns on the first switching transistor M6 during the switching on phase ($T_{ON}$), the voltage $V_{current\_out}$ at the output of the differential amplifier 182 is applied to the inverting (−) input of the differential amplifier 182. The differential amplifier 182 will respond to this by driving the voltage $V_{current\_out}$ toward the voltage $V_{sense} - V_{current\_out}$ (i.e., towards zero volts). Conversely, when the control signal 120 turns on the second switching transistor M7 during the switching off phase ($T_{OFF}$), the reference voltage (ground) is instead applied to the inverting (−) input of the differential amplifier 182. The differential amplifier 182 will respond to this by driving the voltage $V_{current\_out}$ toward the voltage Vsense. Over time, due to the averaging function provided by the unity gain integration on capacitor 184, the voltage $V_{current\_out}$ at the output of the differential amplifier 182 will settle at a value equal to:

$$V_{current\_out} = Vsense * \left(\frac{T_{ON} + T_{OFF}}{T_{ON}}\right) = \frac{Vsense}{D}$$

The voltage $V_{current\_out}$ at the output of the differential amplifier 182 is the signal indicative of the extrapolated value $I_{OUTextrap}$ for the output current $I_{OUT}$ of the switching regulator.

Although illustrated herein by example only for the calculation of switching regulator output current for a buck-type circuit, it will be understood that the technique disclosure herein is equally application to other types of the switching regulator circuit (boost, buck-boost, inverting, etc.).

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A switching regulator circuit, comprising:
a high side (HS) transistor coupled between a first node and a switching node;
a low side (LS) transistor coupled between the switching node and a second node;
driver circuitry for controlling actuation of the HS transistor and LS transistor in accordance with a duty cycle;
an inductor having a first terminal coupled to the switching node and a second terminal coupled to a third node, wherein an output current flows through the inductor;
an output current detection circuit comprising:
a current sensing circuit configured to sense a transistor current flowing through the HS transistor during HS transistor on time ($T_{ON}$); and
a duty cycle detect and divide circuit configured to detect said duty cycle which controls actuation of the HS transistor and LS transistor, and divide the sensed transistor current by said duty cycle to generate an output signal indicative of the output current that flows through the inductor.

2. The circuit of claim 1, wherein the first node is configured to receive an input voltage, the second node is configured to receive a reference voltage and the third node is an output voltage node.

3. The circuit of claim 1, wherein said duty cycle detect and divide circuit comprises:
a first differential amplifier having a first input coupled to receive the sensed transistor current and a second input and an output producing said output signal;
a capacitor coupled in feedback between the output of the first differential amplifier and the second input;
a first switching transistor coupled between the output of the first differential amplifier and a further switching node, said first switching transistor controlled by a high side signal controlling the HS transistor;
a second switching transistor coupled between the further switching node and the second node, said second switching transistor controlled by a low side signal controlling the LS transistor; and
a feedback path coupled between the further switching node and the second input of the first differential amplifier.

4. The circuit of claim 1, wherein said duty cycle detect and divide circuit comprises:
a first differential amplifier having a first input coupled to receive the sensed transistor current and a second input and an output producing said output signal;
a capacitor coupled in feedback between the output of the first differential amplifier and the second input; and
a switching feedback circuit controlled in response to alternating switching of the HS and LS transistors to alternately apply a signal at the output of the first differential amplifier and a reference voltage to the second input of the first differential amplifier.

5. The circuit of claim 1, wherein said current sensing circuit comprises:
a second differential amplifier having a first input, a second input and an output;
a first input transistor coupled between a first terminal of the HS transistor and the first input of the second differential amplifier;
a second input transistor coupled between a second terminal of the HS transistor and the second input of the second differential amplifier;
wherein said first and second input transistors are actuated during HS transistor on time ($T_{ON}$);
an output transistor coupled between the first input of the second differential amplifier and a first intermediate node; and
a resistor coupled between the first intermediate node and the second node.

6. The circuit of claim 5, wherein said current sensing circuit further comprises a low pass filter circuit coupled between the first intermediate node and the second node, said low pass filter circuit having a second intermediate node outputting the sensed transistor current.

7. A circuit for detecting output current of a switching regulator circuit having a high side (HS) transistor actuated during on time ($T_{ON}$) of a duty cycle, comprising:
a current sensing circuit configured to sense a transistor current flowing through the HS transistor during HS transistor on time ($T_{ON}$); and
a duty cycle detect and divide circuit configured to detect said duty cycle, and divide the sensed transistor current by said duty cycle to generate an output signal indicative of the output current of the switching regulator circuit.

8. The circuit of claim 7, wherein the switching regulator circuit further includes a low side (LS) transistor, and wherein said duty cycle is detected as a function of a high side drive signal controlling actuation of the HS transistor and a low side drive signal controlling actuation of the LS transistor.

9. The circuit of claim 8, wherein said duty cycle detect and divide circuit comprises:
a first differential amplifier having a first input coupled to receive the sensed transistor current and a second input and an output producing said output signal;
a capacitor coupled in feedback between the output of the first differential amplifier and the second input;
a first switching transistor coupled between the output of the first differential amplifier and a further switching node, said first switching transistor controlled by said high side drive signal;
a second switching transistor coupled between the further switching node and the second node, said second switching transistor controlled by said low side drive signal; and
a feedback path coupled between the further switching node and the second input of the first differential amplifier.

10. The circuit of claim 7, wherein said duty cycle detect and divide circuit comprises:
a first differential amplifier having a first input coupled to receive the sensed transistor current and a second input and an output producing said output signal;
a capacitor coupled in feedback between the output of the first differential amplifier and the second input; and a switching feedback circuit controlled in response to switching of the HS transistor to alternately apply a signal at the output of the first differential amplifier and a reference voltage to the second input of the first differential amplifier.

11. The circuit of claim 7, wherein said current sensing circuit comprises:
a second differential amplifier having a first input, a second input and an output;
a first input transistor coupled between a first terminal of the HS transistor and the first input of the second differential amplifier;
a second input transistor coupled between a second terminal of the HS transistor and the second input of the second differential amplifier;
wherein said first and second input transistors are actuated during HS transistor on time ($T_{ON}$);
an output transistor coupled between the first input of the second differential amplifier and a first intermediate node; and
a resistor coupled between the first intermediate node and the second node.

12. The circuit of claim 11, wherein said current sensing circuit further comprises a low pass filter circuit coupled between the first intermediate node and the second node, said low pass filter circuit having a second intermediate node outputting the sensed transistor current.

13. A method for detecting output current of a switching regulator circuit having a high side (HS) transistor actuated during on time ($T_{ON}$) of a duty cycle, comprising:
sensing a transistor current flowing through the HS transistor during HS transistor on time ($T_{ON}$);
detecting said duty cycle; and
dividing the sensed transistor current by said duty cycle to generate an output signal indicative of the output current of the switching regulator circuit.

14. The method of claim 13, wherein detecting said duty cycle comprises determining the duty cycle as a function of a high side drive signal controlling actuation of the HS transistor.

15. The method of claim 13, wherein the switching regulator circuit further includes a low side (LS) transistor, and wherein detecting said duty cycle comprises determining the duty cycle as a function of a high side drive signal controlling actuation of the HS transistor and a low side drive signal controlling actuation of the LS transistor.

16. The method of claim 13, wherein sensing the transistor current comprises:
sampling a first voltage at a first terminal of the HS transistor during on time ($T_{ON}$);
sampling a second voltage at a second terminal of the HS transistor during on time ($T_{ON}$);
differentially processing the first and second voltages to generate a sensed current replicating the transistor current flowing through the HS transistor;
converting the sensed current to a voltage; and
smoothing the voltage to generate said sensed transistor current.

17. The method of claim 13, wherein detecting and dividing comprises:
integrating a difference between the sensed transistor current and a switched signal;
wherein said switched signal has a first value during the on time ($T_{ON}$) of the duty cycle and wherein the switched signal has a second value during an off time ($T_{OFF}$) of the duty cycle.

18. The method of claim 17, wherein the first value is the output signal and the second value is a reference.

19. The method of claim 18, wherein the reference is ground.

* * * * *